US009539653B2

(12) United States Patent
Rogalla et al.

(10) Patent No.: US 9,539,653 B2
(45) Date of Patent: Jan. 10, 2017

(54) TWIST DRILL

(71) Applicant: Walter AG, Tübingen (DE)

(72) Inventors: Siegfried Rogalla, Gengenbach (DE);
Stefan Thoma, Waldkirch (DE)

(73) Assignee: Walter AG, Tübingen (DE)

( * ) Notice: Subject to any disclaimer, the term of this patent is extended or adjusted under 35 U.S.C. 154(b) by 0 days.

(21) Appl. No.: 14/649,318

(22) PCT Filed: Dec. 5, 2013

(86) PCT No.: PCT/EP2013/075676
§ 371 (c)(1),
(2) Date: Jun. 3, 2015

(87) PCT Pub. No.: WO2014/095395
PCT Pub. Date: Jun. 26, 2014

(65) Prior Publication Data
US 2015/0314378 A1  Nov. 5, 2015

(30) Foreign Application Priority Data
Dec. 20, 2012  (DE) .................. 10 2012 112 781

(51) Int. Cl.
B23B 51/02  (2006.01)

(52) U.S. Cl.
CPC .......... *B23B 51/02* (2013.01); *B23B 2251/043* (2013.01); *B23B 2251/408* (2013.01);
(Continued)

(58) Field of Classification Search
CPC ................ B23B 51/02; B23B 2251/44; B23B 2251/443; B23B 2251/446; B23B 2251/08; B23B 2251/248; Y10T 408/9097; Y10T 408/907
See application file for complete search history.

(56) References Cited

U.S. PATENT DOCUMENTS 3,667,857 A * 6/1972 Shaner et al. .......... B23B 51/08
                                                   408/230
5,074,728 A  12/1991 Hsu
5,503,237 A   4/1996 Neukirchen
7,306,411 B2 12/2007 Mabuchi et al.
7,837,418 B2 11/2010 Lang et al.
(Continued)

FOREIGN PATENT DOCUMENTS

CN    1910003     2/2007
DE    19807429 A1 8/1999
(Continued)

OTHER PUBLICATIONS

International Search Report and Written Opinion dated Mar. 11, 2014 for International application No. PCT/EP2013/075676.
(Continued)

*Primary Examiner* — Daniel Howell
*Assistant Examiner* — Chwen-Wei Su
(74) *Attorney, Agent, or Firm* — Morgan, Lewis & Bockius LLP

(57) ABSTRACT

A twist drill has a shaft and a flute portion, which extends between a drill tip and the shaft and has at least two flutes, which run helically around it at an angle of twist, are separated from one another by two webs and have a land extending between the flutes on the circumference of the flute portion. In order to provide a twist drill that has the features mentioned at the beginning, has better lubrication of the round bevels, less wear, improved guidance and improved concentricity, at least two round bevels that are spaced apart from one another are provided on each land and extend on the land at an angle of inclination in relation to the drill axis that is greater than the angle of twist but less than 90°.

15 Claims, 4 Drawing Sheets

(52) U.S. Cl.
CPC ..... *B23B 2251/44* (2013.01); *B23B 2251/446* (2013.01); *Y10T 408/907* (2015.01); *Y10T 408/9097* (2015.01)

(56) References Cited

U.S. PATENT DOCUMENTS

| | | | | |
|---|---|---|---|---|
| 2004/0101379 | A1* | 5/2004 | Mabuchi | B23B 51/02 408/230 |
| 2008/0199268 | A1* | 8/2008 | Krenzer | B23B 51/02 408/230 |
| 2009/0047080 | A1* | 2/2009 | Schweighofer | B23B 51/02 408/59 |
| 2009/0277691 | A1 | 11/2009 | Geier et al. | |
| 2010/0158627 | A1* | 6/2010 | Mir | B23B 51/02 408/230 |
| 2012/0121350 | A1* | 5/2012 | Kitamori | B23B 51/02 408/199 |

FOREIGN PATENT DOCUMENTS

| | | |
|---|---|---|
| DE | 102008022945 A1 | 12/2009 |
| EP | 0891239 B1 | 1/1999 |
| FR | 1274316 A | 10/1961 |
| GB | 25179 A | 0/1907 |
| JP | 05050313 A * | 3/1993 |
| JP | 2007075942 A * | 3/2007 |
| WO | 98/35777 A1 | 8/1998 |

OTHER PUBLICATIONS

German Search Report in 10 2012 112 781.6 dated Jul. 15, 2013.
English Translation of First Office Action for Chinese Application No. 201380067355.6 dated Mar. 30, 2016.
International Preliminary Report on Patentability dated Jul. 2, 2015, for International application No. PCT/EP2013/075676

* cited by examiner

TWIST DRILL

The present application is a U.S. National Phase Application of International Application No. PCT/EP2013/075676, filed 5 Dec. 2013, which claims priority to German Application No. 10 2012 112 781.6, filed 20 Dec. 2012.

The present invention concerns a twist drill comprising a shank and a flute portion which extends between a drill tip and the shank and has at least two flutes which peripherally extend helically at a twist angle ($\alpha$) and which are separated from each other by two webs and which respectively has at least two margins on the lands radially delimiting the webs.

Twist drills of that kind are known for example from U.S. Pat. No. 7,306,411 B2 and EP 0 891 239.

FR 1 274 316 discloses structures which could serve as margins, whose angle relative to the axis however, also measured from the axis in the same direction as the edges of the spiral flutes, is to be greater than 90° according to the description and drawing.

Citation WO 98/35777 discloses a twist drill, at the front end of which the drill webs are provided with thread flights. Such thread flights cut a thread in the wall of the drilled hole and the purpose thereof is to impart an axial advance movement to the drill. They are therefore not margins which guide the drill in the hole produced by the drill tip.

U.S. Pat. No. 5,074,728 describes a screw having a drill tip, that is to say a screw which produces its own threaded bore. Quite evidently the thread in this screw must also cut into the wall of the bore and does not serve for guiding a drill or the screw in the manner of margins.

GB 25 179 describes a combined drill and reamer, in which the drill webs have a toothed structure which can also be viewed as interruptions in the web, but in this case also the inclination of the surfaces formed in that way relative to the drill axis is greater than 90°. The leading edges of those structures are in the form of cutting teeth and are evidently intended to further ream out a corresponding drilled hole. Those structures are therefore also not margins.

Particularly when drilling holes whose length is a multiple greater, for example at least by five times, than the hole diameter, drills which do not have any margins on their land either suffer from high friction, more specifically when the hole diameter defined by the land corresponds to the nominal diameter or is only slightly smaller, or the drill has a tendency to oscillate or vibrate in the hole when the lands (without margins) define a diameter markedly smaller than the nominal diameter. Both scenarios can lead to premature breakage of the drill. That obviously really only applies when the ratio of the length of the flute portion to the nominal diameter of the drill is more than 10 and in particular more than 20.

For that reason corresponding twist drills, in particular if they are intended for deep holes (hole depth typically at least eight to ten times the drill hole diameter), are mostly provided with margins, as is demonstrated by the above-quoted state of the art in accordance with U.S. Pat. No. 7,306,411 B2 and EP 0 891 239.

The margins (which are also referred to as "guide bevels") are usually narrow strips which project somewhat from the surface of the land and which are arranged on the land and which serve to guide the drill in the hole insofar as the surface thereof lies on a cylindrical surface around the axis of the drill and thus provides a guide surface.

In that respect the land is not completely covered by the margins in order to correspondingly keep down the friction in the respectively produced hole.

In addition the radius (measured from the drill axis) of the cylindrical surface defined by the outside surface of the margins is slightly smaller than the nominal radius of the drill and thus somewhat smaller than the radius of the drilled hole produced. In specific terms most drills of that kind, behind the radially outer cutting corners of the leading cutting edges which define the nominal diameter of the drill and thus the diameter of a hole drilled therewith, have a continuous or stepped narrowing by which the outside diameter, measured over diametrally oppositely disposed margins or in the form of a doubled round bevel radius, narrows with respect to the drilled hole diameter by up to for example 0.3 mm. That narrowing, viewed from the drill tip, can extend in a straight line or concavely or convexly curved. More precisely therefore the external envelope surface defined by the outside surfaces of the margins is not a cylindrical surface but part of a surface of a cone, although with an extremely small cone angle of typically less than 0.5°, for example between 0.1° and 0.2°.

It will be noted however that the flute portion should also not have any clearance worth mentioning in the hole because otherwise, at least in the case of deep-hole drills, oscillations and vibrations can occur which can have a detrimental effect on the quality of the drilled hole and the breaking strength of the drill. To avoid detrimental oscillations the radial clearance of the flute portion or the lands (inclusive of margins and the provided narrowing) in the drilled hole should be less than 0.3 mm.

The narrowing can also end as from a certain distance from the drill tip, for example from ten times the nominal diameter, so that progressing further in the direction of the shank, the drill is of a constant diameter which is less than the nominal diameter of the drill by up to 0.5 or 0.6 mm.

In the known twist drills with margins those margins generally follow the configuration of the secondary cutting edge, that is to say they extend at the same twist angle relative to the drill axis as the secondary cutting edges and the flutes.

U.S. Pat. No. 5,503,237 discloses a twist drill with margins which do not extend parallel to the secondary cutting edge but perpendicularly to the drill axis and which can effectively be viewed as parts of notional peripherally extending supporting rings which are respectively interrupted only by the flutes.

The margins following the twist of the lands and flutes can directly adjoin the secondary cutting edge which is formed by the intersection line of the flute surface and the land surface or round bevel surface. Margins can however also be at a spacing relative to that secondary cutting edge. In addition, a plurality of margins can also be arranged along a land or at the same web, at certain peripheral angle spacings relative to each other. In many cases the drills, more precisely the margins, are equipped with additional secondary cutting edges insofar as for example the land also has a recess acting as a small flute, in front of a round bevel in the direction of rotation, and the transition from the recess to the peripheral surface of the round bevel is in the form of a further secondary cutting edge.

The drill then has effectively a plurality of secondary cutting edges which are displaced relative to each other in the peripheral direction and each of which is adjoined by a round bevel. In that respect it is also already known that it is possible to have, for each main cutting edge, that is to say on each of the webs separated by main flutes, for example three secondary cutting edges along corresponding margins.

Twist drills are in addition also known which, besides a first round bevel directly adjoining the secondary cutting edge, also have a still further round bevel parallel to the first round bevel, wherein the interposed surface of the land is on a cylindrical surface whose diameter is only slightly smaller than the diameter defined by the margins.

The twist drill known from EP 0 891 239 has on each land two margins, but at different angular spacings relative to each other.

One of the problems with conventional drills is that of easily detecting corresponding wear of the drill tip, in good time. Another problem involves the friction which inevitably occurs in the drilled hole due to the margins and which can be made still worse, precisely when using a plurality of successively arranged margins, by virtue of cutting chips becoming jammed in the narrow gap between land and wall of the drilled hole and between two margins provided on the land. In addition the second trailing round bevel in corresponding drills is often only inadequately supplied with the coolant or lubricant which is typically supplied at the drill tip and transported away predominantly by way of the flutes.

The twist drills known from U.S. Pat. No. 5,503,237, in which numerous margins extend exclusively in the peripheral direction, that is to say form respective short portions of a peripherally extending ring on the lands, suffer from the disadvantage that they rather impede transport of lubricant in the axial direction as they do not have any axial component whatsoever.

In comparison with that state of the art the object of the present invention is to provide a twist drill having the features set forth in the opening part of this specification, which eliminates at least one of the above-mentioned problems. On the one hand the invention seeks to provide that the provided margins enjoy better lubrication. In addition it would be advantageous if the risk of chips becoming jammed on the land between adjacent margins were reduced. Finally, it would also be advantageous if wear on a corresponding drill were easier to see.

For a drill having the features set forth in the opening part of this specification that object is attained in that provided on each land are at least two respective mutually spaced margins which extend on the land at an angle of inclination (β) relative to the drill axis, that is larger than the twist angle α of the flutes, but less than 90°. In that case the twist angle and the angle of inclination are measured from the axis of the drill in the same direction.

By virtue of the fact that the margins (measured from the axis) are at a larger angle of inclination than the flutes, wherein the twist angle of the flutes is self-evidently the same as the twist angle of the secondary cutting edges or the land, the margins cannot extend over the entire axial length of the land but extend diagonally over the land and respectively end at the secondary cutting edge and at the rearward edge of the land at the transition to the next following flute. The intermediate spaces between adjacent margins, that is to say the land regions between adjacent margins, which here are also referred to as recesses or passages, then respectively end at the secondary cutting edge or a rearward transitional edge of the land to the next following flute, that is to say they are open towards the two flutes delimiting the land.

That has the advantage that any lubricant which is in the flutes has easier access to the margins by way of those intermediate spaces or recesses and thus reduces the coefficient of friction of the margins. The lubricant is also better transported in the axial direction due to the angle of inclination (different from 90°) of the margins.

In addition any chips which pass into the recess between two adjacent margins can very rapidly pass to the next flute on the open side of the intermediate space between the margins.

The twist drill according to the invention, the design configuration of which has advantages in particular for deep-hole drills, provides for reduced friction in respect of the flute portion within the drilled hole, with at the same time better guidance by the margins, which also results in smoother operation of the drill. In that way it is also possible to further improve the quality of the drilled hole.

A further advantage of the drill according to the invention lies in faster and easier wear detection as, with wear of the drill tip, the end relief surface moves axially back due to abrasive wear and as a result the position of a round bevel at the transition between land and end relief surface is displaced in the peripheral direction relative to the respective main cutting edge.

Desirably the so-called "recess" after the external contour of the drill is finished, including the outside surfaces of the margins, is produced by grinding in that recess in the initially not yet interrupted land. Accordingly the recess is in the form of a groove which separates the two margins from each other. That groove can be of substantially any cross-section, for example rectangular, triangular, trapezoidal or round, and for example is of a depth (measured from the envelope surface defined by the margins) of between 0.01 and 0.5 mm. Preferably the depth is between 0.05 and 0.2 mm.

According to an embodiment it is provided that the angle of inclination is larger than the twist angle by at least 5°, but at the same time is also smaller than 85°, preferably smaller than 80°. The difference between the angle of inclination and the twist angle of at least 5° ensures that the narrow recess on the land between two adjacent margins within the length of the flute portion actually extends over the entire width of the land, that is to say it is open towards the two adjacent flutes so that the above-described effects can also occur.

The difference between twist angle and angle of inclination is preferably more than 10° and in particular can be in the range of between 20 and 40°, the twist angle typically being of the order of magnitude of 30° (±10°).

In a variant it can be provided that the lands, at least in a tip portion of the drill, including the margins provided thereon (in the peripheral direction) have a relief angle of at least 1°. That avoids an increased amount of friction additionally also occurring in the region of the margins in the proximity of the tip directly at the drill tip where in any case the torque loading on the drill due to engagement of the main cutting edges with the workpiece is at its greatest. Otherwise an axial clearance effect is effectively also already afforded by the narrowing of the flute portion, that begins behind the cutting corners.

Up to the spacing A from the drill tip and possibly apart from a short portion at the tip the relief angle on the margins in the peripheral direction is 0 degree. In that case the spacing A should be at least three times the drill diameter and it can at a maximum correspond to the length (L) of the flute portion but also, particularly in the case of slot drills whose length-to-diameter ratio (with respect to the flute portion) is beyond 10 or 15, it can also be limited to a value which for example is between ⅓ and ⅔ of the length L of the flute portion.

In the region thereabove, that is to say at a spacing relative to the drill tip greater than the spacing A and less than the length L of the flute portion, it is optionally possible to dispense with the margins.

The width of the margins, measured perpendicularly to their longitudinal extent, should be between 0.2 and 2 mm, preferably being in the range of between 0.5 and 1.0 mm.

The width of the guide bevels is generally a compromise between on the one hand the friction to be tolerated and on the other hand the action as a guide surface sliding against the wall of the drilled hole.

The internal spacing, that is to say the width of the recesses, between adjacent margins, should in that case also be at least 0.2 and at a maximum 5 mm, preferably that internal spacing being between 0.5 and 2 mm.

In an embodiment it is provided that the drill, starting from the cutting corners at the radially outer end of the main cutting edges, narrows slightly in the direction of the shank, wherein preferably the narrowing is between 0.1 and 0.8 mm per 100 mm of length of the narrowing portion.

In an embodiment the twist drill according to the invention comprises solid carbide.

Further advantages, features and possible uses of the present invention will be apparent from the description hereinafter of a preferred embodiment and the accompanying Figures in which.

Figure 4:
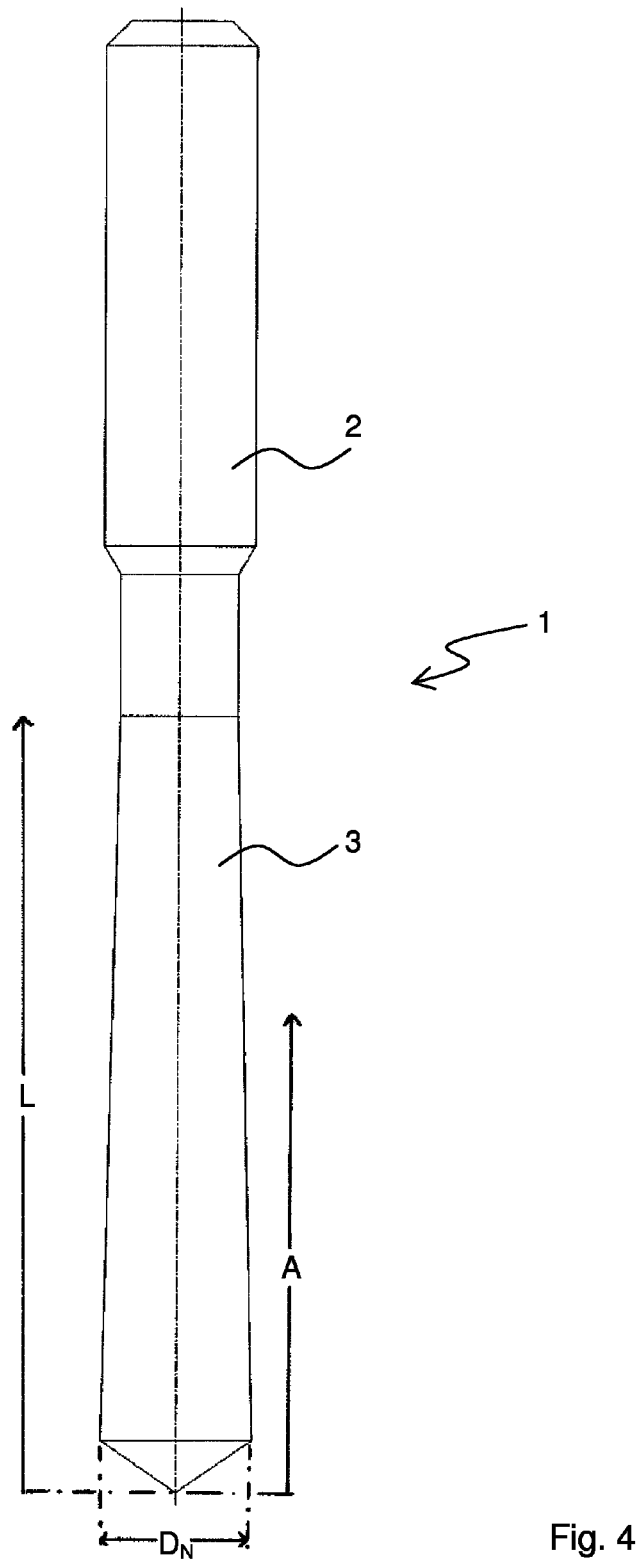

FIG. 4 diagrammatically shows the contour of a twist drill according to the invention.

FIGS. 1 through 4 firstly show a twist drill denoted generally by reference 1, comprising a shank portion 2 and a flute portion 3 which extends between a tip 4 which is of a wedge-shaped or cone-shaped configuration in side view, and the shank portion 2. As can be seen from the end plan view in FIG. 3 the twist drill 1 has two flutes 5 separated from each other by two webs 6. At the tip 4 of the drill the webs 6 end in relief surfaces 8 which define the main cutting edges 7 along an intersection line with the inside surfaces of the flutes 5.

Figure 1:
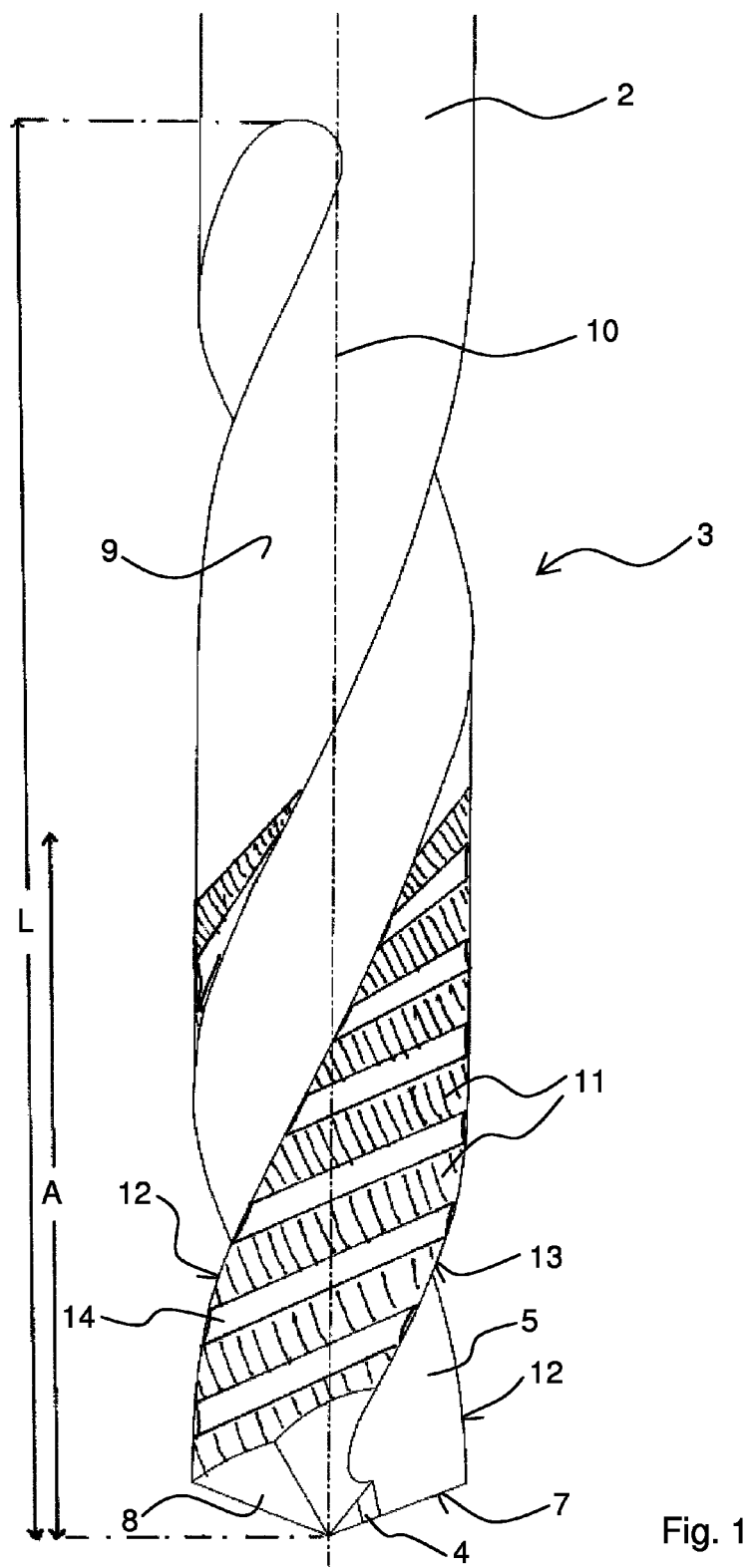
FIG. 1 shows a side view of a twist drill according to the invention.
Figure 2:
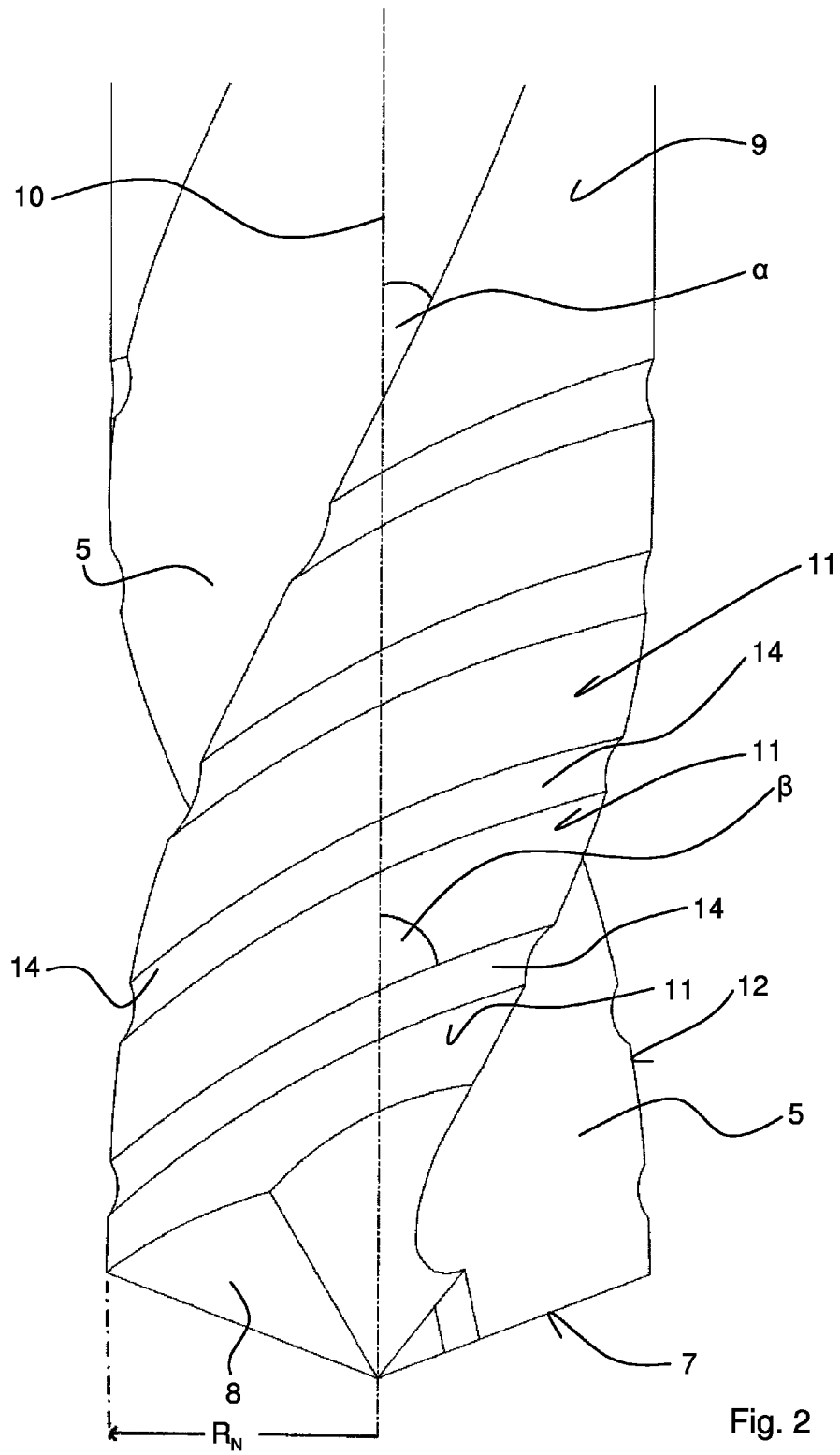
FIG. 2 shows a side view of the tip portion of the twist drill of FIG. 1.
Figure 3:
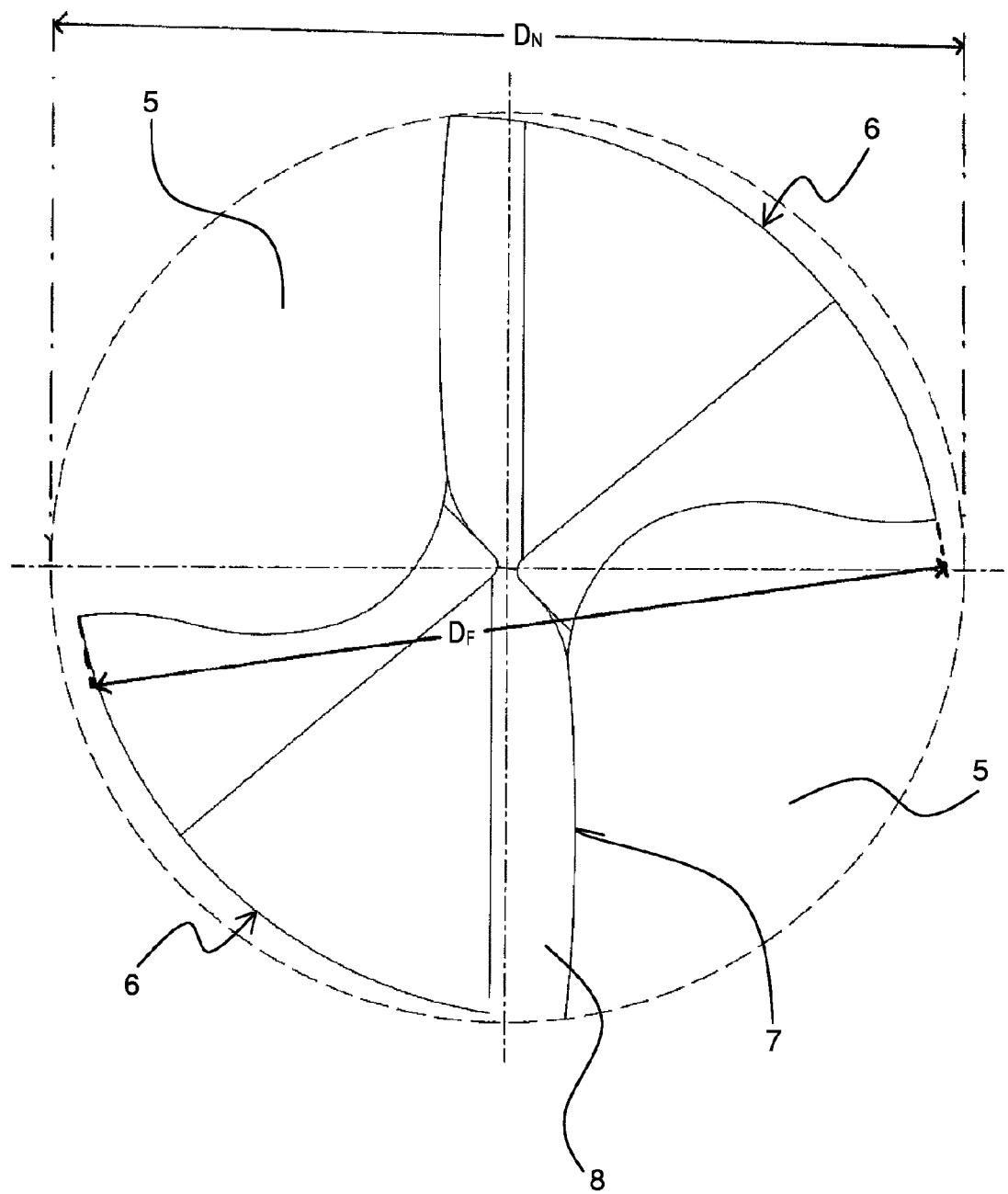
FIG. 3 shows an end plan view on to the tip of the twist drill of FIG. 1.

The particularities of the drill according to the invention can be seen primarily from FIG. 2. FIG. 2 shows an enlarged side view of a front tip portion of the twist drill 1 or the flute portion 3, and one of the webs 6 with a land 9 which extends between the two flutes 5. A plurality of parallel margins 11 extend on the land 9 at an angle of inclination $\beta$ relative to the drill axis 10, which in this embodiment is about 30° greater than the twist angle $\alpha$ which defines the inclination of the flutes or the secondary cutting edges 12 relative to the axis 10 of the drill. The margins 11 are of a width (measured perpendicularly to their longitudinal extent (or at an angle $\beta$-90° relative to the axis 10)) that is between 0.2 and 5 mm and preferably between 0.5 and 1.5 mm, wherein the spacing between the margins 11, that is to say the width of the recesses 14, is also in the range of between 0.2 and 5 mm and preferably between 0.5 and 1.5 mm.

The margins 11 extend over the lands 9 at least within a spacing A from the drill tip 4, the spacing A being at least three times the nominal diameter D of the drill. In a tip portion which at a maximum is twice the nominal diameter of the drill, the land including the margins could be provided with a relief angle. The different diameters $D_N$ and $D_F$ (with $D_N > D_F$) in FIG. 3 however do not necessarily arise out of a relief angle in the peripheral direction, but inevitably also already occur by virtue of the fact that the diameter identified as $D_F$ is measured in a plane axially closer to the shank, than the diameter $D_N$, wherein the outside contour of the drill overall narrows towards the shank and the margins extend inclinedly relative to the axis and the drill diameter is to be determined only where there are diametrally oppositely disposed margins.

FIG. 4 once again diagrammatically shows the overall contour of the drill. The drill 1 comprises a shank 2 (which here is stepped) and the flute portion 3. The flute portion 3 narrows, starting from the maximum diameter $D_F$ at the cutting corners or radially outer ends of the main cutting edges 7, in the direction of the shank to a somewhat smaller diameter (respectively measured over the margins). The narrowing is in a range of for example between 0.1 and 0.8 mm per 100 mm of length of the flute portion 3, wherein the flute portion 3 can also go to a constant diameter again, as from a certain length of the narrowed region.

It will be appreciated that the considerations relating to the diameter would similarly also apply for drills with an odd number of cutting edges, in which the diameter would be defined as double the radius from the axis to the outside surface of a round bevel, as the lands 9 and the margins 11 are then generally no longer disposed in mutually opposite relationship.

In the region above the portion A the drill diameter remains constant, that is to say the outside surfaces of the margins 11 lie on a cylindrical surface around the axis 10 of the drill 10, with a radius which is somewhat smaller (for example between 0.1 and 0.3 mm) than the nominal radius of the drill.

The lateral boundaries of the margins 11 do not form any cutting edges. Extending between the secondary cutting edge 12 and the rearward edge 13 of the land 9 are respective passages 14 which are formed by the recesses and which extend at the same angle of inclination $\beta$ relative to the axis 10 as the margins 11 and which provide for an improved supply of lubricant for the surfaces of the margins 11. Any drilling chips which pass into the passage 14 can be relatively easily and quickly transferred from the passage 14 into the next following flute 5 by way of the rearward edge 13 of the land, by virtue of the rotation of the drill and its angle of inclination of the margins 11.

The inclination of the margins relative to the axis permits smooth operation of the drill in the hole and distributes the guide action of a round bevel on a shorter axial portion over a larger peripheral region than in the case of margins which follow the inclination of the flutes or the secondary cutting edges 12.

At the same time however adjacent margins also overlap in the axial direction so that their lands at each axial position are supported against the wall of the drilled hole by way of at least two spaced margins.

The margins can possibly be completely removed in the upper part of the flute portion 3 which is between the spacing A relative to the drill tip and the shank 2, in which case the land defines an outside radius which is for example between 0.1 and 0.3 mm below the nominal radius of the drill.

Wear at the drill tip can be detected in particular by virtue of the position of a round bevel along the edge formed between the land 9 and the relief surface 8 moving in the peripheral direction with increasing wear of the relief surface 8. The twist drill according to the invention, the design configuration of which has advantages in particular for deep-hole drills, provides for reduced friction at the flute portion within the hole, with at the same time better guidance and smoother running operation of the drill. The quality of the drilled hole can also be further improved in that way.

In regard to the drawings it should be noted that these admittedly on the one hand show realistic dimensional relationships, but are essentially to be interpreted as diagrammatic drawings, in particular in regard to the relationship of length to diameter of the drill, which in reality is generally markedly greater, but also in respect of the flute portion 3 and the portion A. The taper of the flute portion shown in FIG. 4 is also shown in markedly exaggerated form.

For the purposes of the original disclosure it is pointed out that all features as can be seen by a man skilled in the art from the present description, the drawings and the claims, even if they are described in specific terms only in connection with certain other features, can be combined both individually and also in any combinations with others of the features or groups of features disclosed here insofar as that has not been expressly excluded or technical aspects make such combinations impossible or meaningless. A comprehensive explicit representation of all conceivable combinations of features and emphasis of the independence of the individual features from each other is dispensed with here only for the sake of brevity and readability of the description.

The invention claimed is:

1. A twist drill comprising a shank and a flute portion which extends between a drill tip and the shank and has at least two flutes which peripherally extend helically at a twist angle and which are separated from each other by two webs and have a land extending at a periphery of the flute portion between the flutes,
wherein provided on each land are at least two respective mutually spaced margins which extend on the land at an angle of inclination relative to a drill axis, that is larger than the twist angle but less than 90°,
wherein the twist angle and the angle of inclination are measured from the drill axis in the same direction, and
wherein the diameter of the flute portion, defined by the margins, starting from the drill tip, continuously narrows within a distance (A) from the drill tip towards the shank.

2. A twist drill as set forth in claim 1, wherein the angle of inclination is at least 5° larger than the twist angle and less than 85°.

3. A twist drill as set forth in claim 2, wherein the angle of inclination is less than 80°.

4. A twist drill as set forth in claim 1, wherein within a short portion behind the drill tip the lands including the margins have a relief angle>1°.

5. A twist drill as set forth in claim 1, wherein the narrowing is between 0.1 and 0.8 mm per 100 mm of length of the narrowing portion.

6. A twist drill as set forth in claim 1, wherein the distance (A) is at least three times the drill diameter and at a maximum corresponds to the length of the flute portion.

7. A twist drill as set forth in claim 1, wherein the distance (A) is less than the length of the flute portion and the diameter of the flute portion including any margins is constant in the region between the distance (A) and the length of the flute portion and corresponds to the diameter of the narrowed portion at the distance (A) from the drill tip.

8. A twist drill as set forth in claim 1, wherein the width of the margins, measured perpendicularly to the longitudinal extent thereof, is between 0.2 and 5 mm.

9. A twist drill as set forth in claim 8, wherein the width of the margins, measured perpendicularly to the longitudinal extent thereof, is between 0.5 and 1.5 mm.

10. A twist drill as set forth in claim 1, wherein the internal spacing between adjacent margins is at least 0.2 and at a maximum 5 mm.

11. A twist drill as set forth in claim 10, wherein the internal spacing between adjacent margins is between 0.5 and 1.5 mm.

12. A twist drill as set forth in claim 1, wherein the depth of the recess between adjacent margins is between 0.01 and 0.5 mm.

13. A twist drill as set forth in claim 12, wherein the depth of the recess between adjacent margins is between 0.05 and 0.2 mm.

14. A twist drill as set forth in claim 1, wherein the drill comprises solid carbide metal.

15. A twist drill, comprising:
a shank; and
a flute portion,
wherein the flute portion extends between a drill tip and the shank and has at least two flutes, which peripherally extend helically at a twist angle and which are separated from each other by two webs and have a land extending at a periphery of the flute portion between the flutes,
wherein each land includes at least two respective mutually spaced margins that extend on the land at an angle of inclination relative to a drill axis that is larger than the twist angle but less than 90°,
wherein the twist angle and the angle of inclination are measured from the drill axis in the same direction, and
wherein the diameter of the flute portion, defined by the margins, starting from the drill tip, continuously narrows within a distance (A) from the drill tip towards the shank.

* * * * *